Sept. 13, 1932. C. C. WORTHINGTON 1,876,818
LAWN MOWER UNIT
Filed Aug. 3, 1929
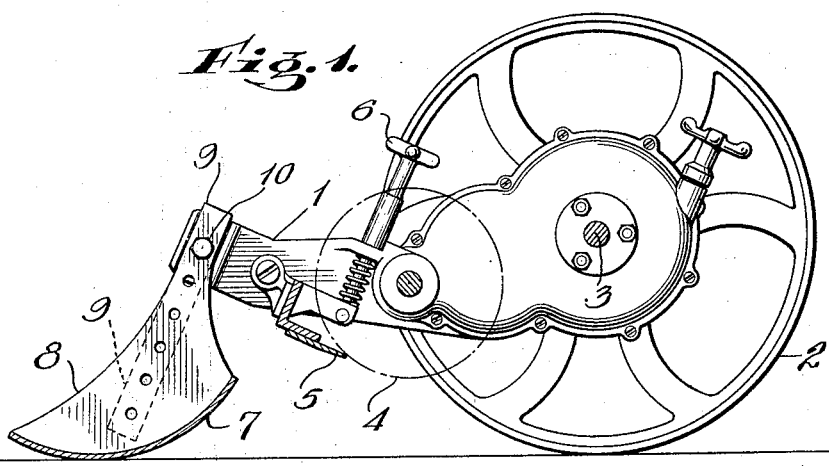
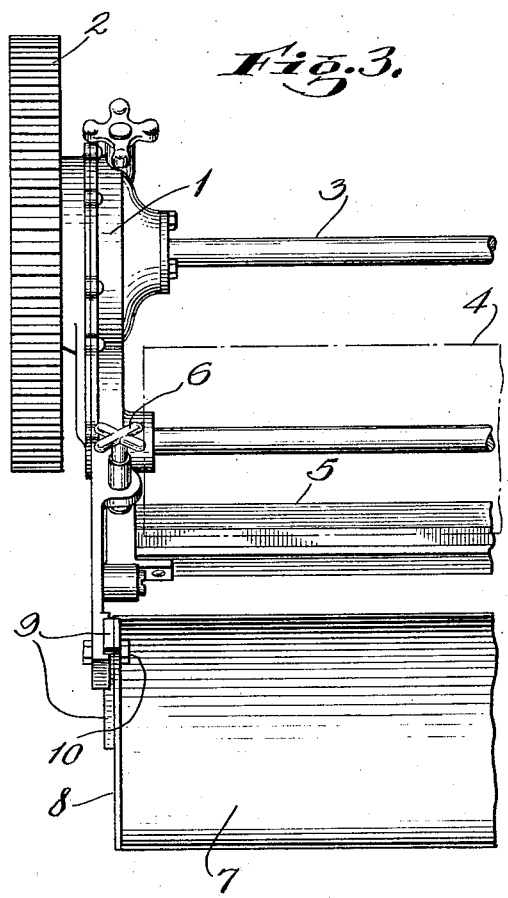
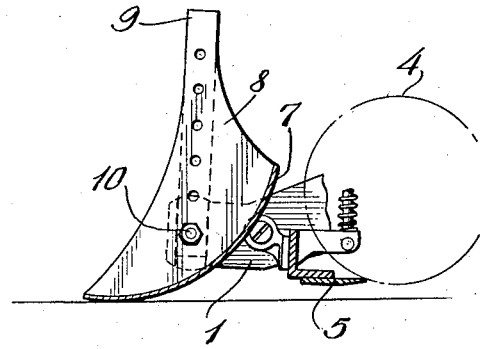
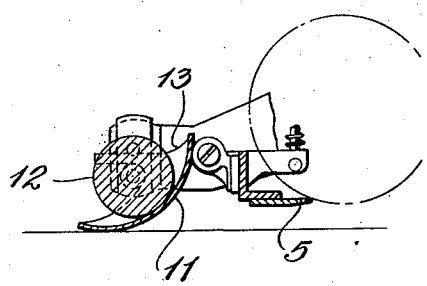
Charles C. Worthington INVENTOR
BY
Jeffery, Kimball & Eggleston ATTORNEYS Patented Sept. 13, 1932

1,876,818

UNITED STATES PATENT OFFICE

CHARLES C. WORTHINGTON, OF DUNFIELD, NEW JERSEY

LAWN MOWER UNIT

Application filed August 3, 1929. Serial No. 383,303.

The invention provides a practical means of adapting lawn mowers for use on loose or sandy soils, as well as other places in which heretofore they have not been suitable, and consists more particularly in improved means for supporting and adjusting the ledger knife above the surface of the ground to establish the height of cut.

The accompanying drawing represents a lawn mower of common design and such as used in gang lawn mowing machines, provided with the form of the invention at present preferred, Fig. 1 being a vertical longitudinal section, Fig. 2 a top plan of one side of such mower, Fig. 3 a rear end elevation, and Fig. 4 a modification.

This mower comprises, as usual, two similar side frames 1, only one of which is illustrated, supported at their forward ends on rotary members or ground wheels 2 and rigidly united at that end by a cross rod 3. One or both may house the gearing, not shown, by which the ground wheel or wheels drive the usual rotary fly knife 4, indicated by dotted lines, and the ledger knife 5 is supported on these frames with provisions 6, whereby it may be properly adjusted to the fly knife.

According to this invention the rear end of the mower frame, which is to say the rear ends of the two side members 1, are supported on the ground by means of a sled-type support in substitution for the usual roller or wheels, and the means of connection of this support to the side members 1 is adjustable, so that by change of its connection, the elevation of the ledger knife above the ground may be set as desired and to mow the grass at any selected height.

The mechanical design of the sled is subject to variation. The one shown comprises a bottom or runner body 7 which may be made of a single sheet metal plate curved in the direction of travel and provided with vertical end flanges 8. Guide keys 9 are secured to or formed on these flanges of cross-sectional size and shape to fit and be secured in the same vertical channels of the members 1, which ordinarily hold the journal brackets of the rear roller, and they are drilled with holes in the same way so that the sled is thus adjustable in such channels, the same as the roller, by the appropriate use of the bolts 10, but preferably through a much greater range of adjustment and so that the ledger knife may be elevated above the ground to make a high cut, as high as four inches or over.

This type of support has the advantage that it slides instead of rolls on the ground and thus it may ride smoothly over loose or sandy soil smoothing the ground surface of such light marks as heel prints, which are always to be seen on sandy golf courses, whereas the customary roller under the same conditions has no smoothing effect and tends to bank up the sand in front of it and settle down into it, which not only disturbs the grass roots but also impedes the forward progress of the gang; and the sled can have such a degree of sheer that it will surmount stones and other obstructions which a roller could not pass with equal ease, or at all, unless made of a diameter so large as to be prohibitive in any unit of a gang lawn mowing machine, and this permits the elevation of the ledger knife to be set high enough to cut the grass at the height referred to, or such as required for aviation and like fields, not generally described as lawns, and without risk of injury to the mower since any stone or obstruction which will pass under the ledger knife will be surmounted and passed over by the sled without shock or strain on the unit or on the gang tractor which hauls it. The sheer of the sled may be a circular curvature such as would be provided by the lower segment of a roller of properly enlarged size if held against rotation, or it may be a straight upward slope, or it may be shaped more truly sled-fashion, as will of course be obvious.

In Fig. 4 the sled there marked 11 is applied to a standard mower without removal of the roller 12, that is to say, by forming its end flanges 13 with hooks adapted to slip over the roller gudgeons or their bearing bosses with the runner or body part passed under the body of the roller as indicated. In this case the roller does not rotate but merely holds the sled and the latter can obviously be made with as much upward-slope or curvature as desired which, with the adjustment possible by changing the roller position, adapts the unit for the uses referred to, though, as shown, in somewhat less degree than the form indicated in Fig. 1. In either case it is found that the mower is quite as easily propelled on the ground, and in sandy soil more easily, than when the roller is used, besides which no lubrication is necessary and, moreover, wear has no appreciable effect on the adjusted height of the ledger knife as it does with the roller, the bearings of which wear rapidly, because they collect sand and grit.

I claim:

1. A lawn mower adapted for use on sandy lawns and the like comprising a frame containing a ledger knife and fly knife, a pair of ground wheels supporting one end of said frame and one or both serving to drive the fly knife, in combination with supporting means for the other end of said frame presenting an extended ground-contacting surface shaped to slide on the ground with a smoothing, as distinguished from a rut-marking effect thereon; and for this purpose being substantially co-extensive laterally with the width of the mower.

2. A lawn mower for sandy lawns comprising a frame containing ledger and fly knives and supported at its forward end by ground wheels one of which drives the fly-knife and a support for the rear end of said frame comprising a sled member extending from side to side of said frame and presenting an extended surface for ground contact, said surface being of sufficient area to ride over and smooth sand or loose soil without cutting into it.

3. In a lawn mower having a frame containing ledger and fly knives and supported at one end on ground wheels and at its other end, normally, on rolling means, a sled-type member adapted for attachment to the mower, extending across the frame thereof, and having a plate presenting an extended ground-contacting surface adapted to take the support of said frame away from said rolling means.

4. A lawn mower for sandy lawns comprising a frame containing ledger and fly knives and supported at one end by ground wheels one of which drives the fly knife and a support for the other end of said frame comprising a sled member structurally independent of said ledger knife blade and its immediate backing or support, and extending from side to side of said frame and presenting an extended smooth surface shaped to ride over irregularities of ground surface.

5. In combination with a lawn mower frame, means for supporting one end thereof comprising a curved sheet member substantially coextensive with the width of said frame and having upstanding flanges, with means adjustably securing said flanges in terminal portions of the frame.

6. A lawn mower for use on sandy lawns and the like comprising a frame supported at one end by a pair of ground wheels, a fly knife journalled in said frame and an adjacent ledger knife adjustable in said frame toward and from the fly knife, a sled member, for supporting the other end of said frame, extending from side to side thereof and adjustable with respect thereto to raise or lower said end of the frame and thereby the height of said bed knife with respect to the ground, in any fixed setting of said bed knife with respect to the fly knife.

In testimony whereof, I have signed this specification.

CHARLES C. WORTHINGTON.